United States Patent
Yang et al.

(10) Patent No.: US 12,185,246 B2
(45) Date of Patent: Dec. 31, 2024

(54) WAKE UP SIGNAL SENDING METHOD, WAKE UP SIGNAL RECEIVING METHOD, BASE STATION AND TERMINAL

(71) Applicant: ZTE CORPORATION, Guangdong (CN)

(72) Inventors: Weiwei Yang, Guangdong (CN); Bo Dai, Guangdong (CN); Kun Liu, Guangdong (CN); Huiying Fang, Guangdong (CN); Youjun Hu, Guangdong (CN); Luanjian Bian, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 821 days.

(21) Appl. No.: 17/280,985

(22) PCT Filed: Sep. 26, 2019

(86) PCT No.: PCT/CN2019/108207
§ 371 (c)(1),
(2) Date: Mar. 29, 2021

(87) PCT Pub. No.: WO2020/063768
PCT Pub. Date: Apr. 2, 2020

(65) Prior Publication Data
US 2021/0360529 A1    Nov. 18, 2021

(30) Foreign Application Priority Data
Sep. 28, 2018   (CN) .................... 201811142313.5

(51) Int. Cl.
*H04W 52/02* (2009.01)
*H04W 72/0446* (2023.01)
(Continued)

(52) U.S. Cl.
CPC .............. *H04W 52/0232* (2013.01); *H04W 52/0219* (2013.01); *H04W 72/0446* (2013.01); *H04W 72/0453* (2013.01); *H04W 72/23* (2023.01)

(58) Field of Classification Search
CPC ......... H04W 52/0232; H04W 52/0219; H04W 72/0446; H04W 72/0453; H04W 72/23;
(Continued)

(56) References Cited

U.S. PATENT DOCUMENTS

2019/0239189 A1* 8/2019 Hwang ............ H04W 52/0216
2020/0205079 A1* 6/2020 Tong .................... H04W 24/00
(Continued)

FOREIGN PATENT DOCUMENTS

CN    103378939 A    10/2013
CN    108028713 A    5/2018
(Continued)

OTHER PUBLICATIONS

Examination Report No. 1 for Australian Patent Application No. 2019348116, dated Mar. 17, 2022 (five (5) pages).
(Continued)

*Primary Examiner* — Fred A Casca
(74) *Attorney, Agent, or Firm* — KDW Firm PLLC

(57) ABSTRACT

Provided are a wake up signal sending method and apparatus, a wake up signal receiving method and apparatus, a base station, a terminal and a storage medium. The number of groups corresponding to a WUS and position information about the WUS are configured. Then, a first sequence corresponding to the WUS is sent in a resource position corresponding to the position information. This implements the configuration and sending of a group wake up signal, and avoids unnecessary PDCCH detection processes of a terminal, thereby reducing the power consumption of the terminal effectively.

15 Claims, 3 Drawing Sheets

(51) Int. Cl.
*H04W 72/0453* (2023.01)
*H04W 72/23* (2023.01)

(58) Field of Classification Search
CPC .......... H04W 52/0229; H04W 52/028; H04W 52/0216; H04W 4/70; H04W 4/025; H04W 52/0235; Y02D 30/70
See application file for complete search history.

(56) References Cited

U.S. PATENT DOCUMENTS

| | | | | |
|---|---|---|---|---|
| 2020/0229095 | A1* | 7/2020 | Shrestha | H04W 68/00 |
| 2020/0280959 | A1* | 9/2020 | Sharma | H04W 52/0219 |
| 2020/0374821 | A1* | 11/2020 | Wu | H04W 52/0229 |
| 2021/0044394 | A1* | 2/2021 | Beale | H04W 72/54 |

FOREIGN PATENT DOCUMENTS

| | | |
|---|---|---|
| WO | 2017043878 A1 | 3/2017 |
| WO | 2018175760 A1 | 9/2018 |

OTHER PUBLICATIONS

First Office Action for Chinese Patent Application No. 201811142313.5, mailed Mar. 7, 2022 (14 pages).
First Search Report for Chinese Patent Application No. 201811142313.5, mailed Feb. 24, 2022 (four (4) pages).
Notification of Reason for Refusal for Korean Patent Application No. 10-2021-7012763, dated Apr. 22, 2022 (14 pages).
Ray, D. et al., 'Saving Energy in Cellular IoT using Low-Power Wake-up Radios', 2018, Master's Thesis, Department of Electrical and Information Technology, Lund University (Aug. 31, 2018).
Huawei, HiSilicon, "On 'wake-up signal' for eFeMTC", 3GPP TSG RAN WG1 Meeting #92; Athens, Greece, Feb. 26-Mar. 2, 2018. R1-1801430.
Nokia, Nokia Shanghai Bell, "UE-group wake-up signal for NB-IoT", 3GPP TSG RAN WG1 Meeting #94; Gothenburg, Sweden, Aug. 20-24, 2018. R1-1808439.
Intel Corporation, "Open issue in WUS", 3GPP TSG RAN WG2 Meeting # 102; Busan, Republic of Korea, May 21-25, 2018. R2-1807524.
Huawei, HiSilicon, "On support for UE-group wake-up signal", 3GPP TSG RAN WG1 Meeting #94, R1-1808107. Gothenburg, Sweden, Aug. 20-24, 2018.
Vivo, "On UE-group wake-up signal for NB-IoT", 3GPP TSG RAN WG1 #94, R1-1808216. Gothenburg, Sweden, Aug. 20-Aug. 24, 2018.
Samsung, "UE-group wake-up signal for NB-IoT", 3GPP TSG RAN WG1 Meeting #94, R1-1808737. Gothenburg, Sweden, Aug. 20-24, 2018.
MediaTek Inc., "UE-Group WUS in NB-IoT", 3GPP TSG RAN WG1 Meeting #94, R1-1808959. Gothenburg, Sweden, Aug. 20-24, 2018.
NTT Docomo, Inc., "UE-group wake-up signal for Rel.16 IoT", 3GPP TSG RAN WG1 Meeting #94, R1-1809131. Gothenburg, Sweden, Aug. 20-24, 2018.
Supplementary European Search Report dated May 18, 2022, for Application No. EP19866205.8 (16 pages).
Qualcomm Incorporated. "Remaining Issues of 6.2.6.3 Wake-up Signal." 3GPP Tsg Ran WG1 Meeting #93, R1-1807528., May 25, 2018.
Webb, Matthew et al. "Status Report to Tsg." 3GPP Tsg Ran Meeting #80, RP-180849., Jun. 14, 2018.
Wi Rapporteur Ericsson. "Agreement Summary for Rel-15 Even Further Enhanced MTC for Lte." 3GPP Tsg- Ran WG1 Meeting #93, R1-1807581., May 25, 2018.
International Search Report for the International Patent Application No. PCT/CN2019/108207, mailed Dec. 27, 2019, 2 pages.

\* cited by examiner

WAKE UP SIGNAL SENDING METHOD, WAKE UP SIGNAL RECEIVING METHOD, BASE STATION AND TERMINAL

CROSS-REFERENCE TO RELATED APPLICATIONS

This application is a U.S. National Stage Application, filed under 35 U.S.C. 371, of International Patent Application No. PCT/CN2019/108207, filed on Sep. 26, 2019, which claims a priority to a Chinese Patent Application No. 201811142313.5 filed with the CNIPA on Sep. 28, 2018, disclosures of which are incorporated herein by reference in their entireties.

TECHNICAL FIELD

Embodiments of the present disclosure relate to, but are not limited to, a wake up signal sending method and apparatus, a wake up signal receiving method and apparatus, a base station, a terminal and a storage medium.

BACKGROUND

Machine type communications (MTC), also referred to as machine to machine (M2M) communications, is a primary application mode of the Internet of things in the current stage. Currently, a deployed MTC device in the market is primarily based on a global system of mobile communications (GSM). In recent years, due to high spectral efficiency of LTE/LTE-A, more and more mobile operators select LTE/LTE-A as an evolution direction of a future broadband radio communication system. Various MTC data traffic based on the LTE/LTE-A is also more attractive.

Several technologies applicable to the comb-Internet of things (C-IoT) have been disclosed in the technical report TR45.820V200 of the 3rd generation partnership project (3GPP). The narrow band-Internet of things (NB-IOT) technology is the most striking. An NB-IoT system focuses on radio frequency (RF) access technologies having low complexity and low throughput. Primary research objects include improved indoor coverage, support for a massive number of low-throughput user equipment, low delay sensitivity, ultra-low equipment costs, low equipment power consumption and network architecture.

A network may send paging to an idle-state user equipment (UE) and a connected-state UE. The paging process may be triggered by a core network and used for instructing a certain UE to receive a paging request, or may be triggered by an eNB and used for a notification about system information update. A paging message is scheduled by using a physical downlink control channel (PDCCH) scrambled by a P-radio network temporary identifier (RNTI), and is transmitted in a physical downlink shared channel (PDSCH). A terminal detects a corresponding PDCCH in a paging occasion (PO) to determine whether a PDSCH indicated by the PDCCH carries the paging message. If the terminal does not detect the corresponding PDCCH in the PO, it is indicated that there is no paging message in the PO. In this case, the terminal enters a sleep state and receives no data until a next detection in the next PO. This is referred to as discontinuous reception (DRX). That is, the terminal needs to perform PDCCH blind detections in each PO, and then, the terminal has a larger power consumption.

To reduce the power consumption of the terminal, a wake up signal (WUS) is introduced. A base station sends, before each PO, a signal for indicating whether to perform PDCCH detections. The terminal first detects the WUS and then determines, on the basis of a detection result of the WUS, whether to detect the corresponding PDCCH. When the WUS is detected, the terminal detects the PDCCH corresponding to the WUS; otherwise, the terminal does not detect the PDCCH. The introduction of the WUS reduces the number of PDCCH detections of the terminal, thereby reducing the power consumption of the terminal. However, the WUS are used for each terminal in a PO. That is, when one terminal needs to be awakened, the base station sends WUSs and other terminals belonging to the same PO are also awakened. Then, the awakened terminals each perform PDCCH detections. This increases the number of unnecessary PDCCH detections of terminals.

SUMMARY

Embodiments of the present disclosure provide a wake up signal sending method and apparatus, a wake up signal receiving method and apparatus, a base station, a terminal and a storage medium.

In a first aspect, an embodiment of the present disclosure provides a wake up signal sending method. The method includes the steps described below.

The number of groups corresponding to a wake up signal (WUS) and position information about the WUS are configured.

A first sequence corresponding to the WUS is sent in a resource position corresponding to the position information.

In a second aspect, an embodiment of the present disclosure further provides a wake up signal receiving method. The method includes the steps described below.

A resource position where the WUS is positioned is determined according to configured position information about a WUS.

A signal in the resource position is received.

A terminal detects the signal.

In a third aspect, an embodiment of the present disclosure further provides a wake up signal sending apparatus. The apparatus includes a configuration module and a sending module.

The configuration module is configured to configure the number of groups corresponding to a WUS and position information about the WUS.

The sending module is configured to send a first sequence corresponding to the WUS in a resource position corresponding to the position information.

In a fourth aspect, an embodiment of the present disclosure further provides a wake up signal receiving apparatus. The apparatus includes a position determination module, a receiving module and a detection module.

The position determination module is configured to determine, according to configured position information about the WUS, a resource position where the WUS is positioned.

The receiving module is configured to receive a signal in the resource position.

The detection module is configured to detect the signal.

In a fifth aspect, an embodiment of the present disclosure further provides a base station. The base station includes a processor, a memory and a communication bus.

The communication bus is configured to implement connection and communication between the processor and the memory.

The processor is configured to execute one or more computer programs stored in the memory, so as to perform the steps of the wake up signal sending method described above.

In a sixth aspect, an embodiment of the present disclosure further provides a terminal. The terminal includes a processor, a memory and a communication bus.

The communication bus is configured to implement connection and communication between the processor and the memory.

The processor is configured to execute one or more computer programs stored in the memory, so as to perform the steps of the wake up signal receiving method described above.

In a seventh aspect, an embodiment of the present disclosure further provides a computer storage medium. The computer-readable storage medium stores one or more programs executable by one or more processors to perform the steps of the wake up signal sending method or the wake up signal receiving method described above.

DETAILED DESCRIPTION

To make the objects, solutions and advantages of the present application more apparent, embodiments of the present disclosure are further described below in detail through specific implementations in conjunction with the drawings. It is to be understood that the embodiments described herein are merely intended to explain the present application and not to limit the present application.

The steps illustrated in the flowcharts of the drawings may be performed by, for example, a computer system capable of executing a group of computer-executable instructions. Moreover, although logical sequences are illustrated in the flowcharts, the illustrated or described steps may be performed in sequences different from those described herein in some cases.

First Embodiment

Figure 1:
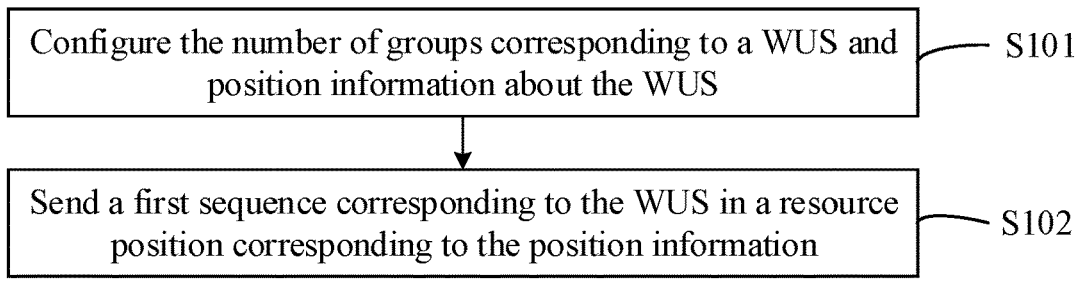
FIG. 1 is a flowchart of a wake up signal sending method according to a first embodiment of the present disclosure.

Referring to FIG. 1, FIG. 1 is a flowchart of a wake up signal sending method according to an embodiment of the present disclosure. The method includes steps S101 and S102 described below.

In step S101, the number of groups corresponding to a wake up signal (WUS) and position information about the WUS are configured.

In step S102, a first sequence corresponding to the WUS is sent in a resource position corresponding to the position information.

In some embodiments, the number of groups is at least one of the following: the number of groups corresponding to a terminal in a paging occasion (PO) corresponding to the WUS, the number of terminal groups corresponding to the same time-frequency resource position, or the number of terminal groups corresponding to the same time domain resource position.

In some embodiments, the resource position corresponding to the position information may include any one of the following: a resource position determined according to the position information; a resource position determined according to at least the position information and a group index corresponding to the WUS; or a resource position determined according to at least the position information, a group index corresponding to the WUS, and a cell identifier.

In some embodiments, the resource position may include at least one of the following: a time domain resource position indicated by the position information, or a frequency domain resource position indicated by the position information. That is, resource positions may be divided into a time domain resource position, a frequency domain resource position and a time-frequency domain resource position according to difference between time domain and frequency domain. The time domain resource position is indicated by time domain position information. The frequency domain resource position is indicated by frequency domain position information. The time-frequency domain resource position is indicated by the time domain resource position and the frequency domain resource position. Correspondingly, the position information also includes at least one of the following: the time domain position information or the frequency domain position information.

In some embodiments, the time domain position information may include at least one of the following: a first time offset, a second time offset, a third time offset or a fourth time offset.

In some embodiments, in the case where the time domain position information includes the first time offset and the second time offset, the first time offset is used for DRX, and the second time offset is used for extended discontinuous reception (eDRX); or in the case where the time domain position information includes the first time offset, the second time offset and the third time offset, the first time offset is used for DRX, and the second time offset and the third time offset are used for eDRX, or the first time offset and the second time offset are used for DRX and the third time offset is used for eDRX; or in the case where the time domain position information includes the first time offset, the second time offset, the third time offset and the fourth time offset, the first time offset and the second time offset are used for DRX, and the third time offset and the fourth time offset are used for eDRX.

In some embodiments, the frequency domain position information may include at least one of the following: a first starting resource block index, a second starting resource block index, a third starting resource block index, a first frequency domain offset or a second frequency domain offset.

In some embodiments, the first sequence is a corresponding sequence selected from a sequence set according to a sent WUS combination.

In some embodiments, correspondence between the sequence set and the WUS combination is preset. The correspondence is determined according to the number of groups. Alternatively, the correspondence is determined according to the maximum number of groups. Optionally, when there are multiple time domain resource positions, various time domain resource positions may have different sequence sets. The case where there are multiple time domain resource positions may also be referred to that there are at least two time domain resource positions.

In some embodiments, the WUS may include at least one of the following: a group WUS or a normal WUS. The group WUS is a WUS corresponding to a group terminal in a PO. The normal WUS is a WUS corresponding to each terminal in the PO.

This embodiment of the present disclosure provides a wake up signal sending method. Position information about a WUS and the number of groups corresponding to the WUS corresponding to a PO are configured. Then, a first sequence corresponding to the WUS is sent in a resource position corresponding to the position information. This implements the configuration and sending of a group wake up signal, and avoids unnecessary PDCCH detection processes of the terminal, thereby reducing the power consumption of the terminal effectively.

Second Embodiment

Figure 2:
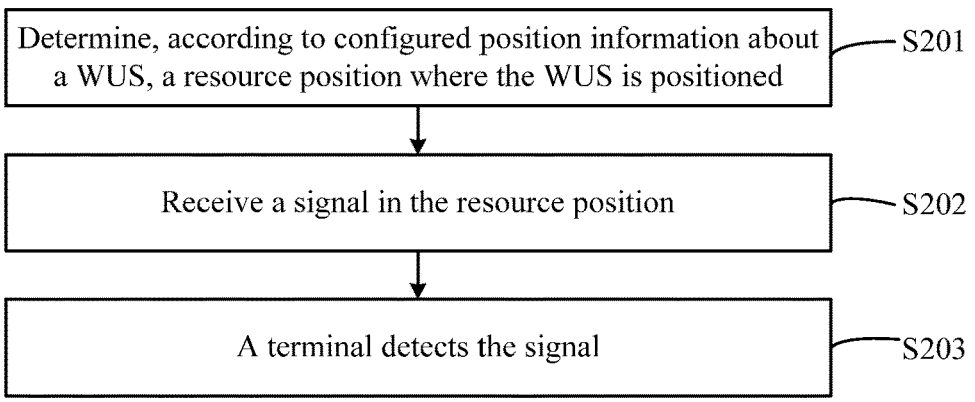
FIG. 2 is a flowchart of a wake up signal receiving method according to a second embodiment of the present disclosure.

Referring to FIG. 2, FIG. 2 is a flowchart of a wake up signal receiving method according to an embodiment of the present disclosure. The method includes steps S201 to S203 described below.

In step S201, a resource position where a WUS is positioned is determined according to configured position information about the WUS.

In step S202, a signal in the resource position is received.

In step S203, a terminal detects the signal.

In some embodiments, the position information may include at least one of the following: time domain position information or frequency domain position information.

In some embodiments, the time domain position information may include at least one of the following: a first time offset, a second time offset, a third time offset or a fourth time offset.

In some embodiments, in the case where the time domain position information includes the first time offset and the second time offset, a terminal configured with a DRX mode uses the first time offset, and a terminal configured with an eDRX mode uses the second time offset; or in the case where the time domain position information includes the first time offset, the second time offset and the third time offset, a terminal configured with a DRX mode uses the first time offset and a terminal configured with an eDRX mode uses the second time offset and the third time offset, or a terminal configured with a DRX mode uses the first time offset and the second time offset and a terminal configured with an eDRX mode uses the third time offset; or in the case where the time domain position information includes the first time offset, the second time offset, the third time offset and the fourth time offset, a terminal configured with a DRX mode uses the first time offset and the second time offset, and a terminal configured with an eDRX mode uses the third time offset and the fourth time offset.

In some embodiments, the frequency domain position information may include at least one of the following: a first starting resource block index, a second starting resource block index, a third starting resource block index, a first frequency domain offset or a second frequency domain offset.

In some embodiments, the step in which the resource position where the WUS is positioned is determined according to the configured position information about the WUS includes at least one of the steps described below:

a frequency domain position where the WUS is positioned is determined according to at least configured frequency domain position information;

a time domain resource position where the WUS is positioned is determined according to at least configured time domain position information;

a time domain resource position where WUS is positioned is determined according to at least a preset condition; where the preset condition includes at least one of the following: the processing capability of the terminal, signaling, a group index or a terminal identifier;

a frequency domain position where the WUS is positioned is determined according to at least a corresponding group index and a terminal identifier.

In some embodiments, the group index may be determined according to at least one of the following: the number of groups, a resource position, a terminal identifier, a terminal type, a terminal capability.

In some embodiments, the group index may be determined according to at least one of the following: the configured number of groups, or a terminal identifier group index.

In some embodiments, the step in which the terminal detects the signal specifically includes: determining a detection sequence set, and detecting the signal according to the detection sequence set.

The detection sequence set is determined according to the group index and the number of groups. Alternatively, the detection sequence set is determined according to the WUS and the number of groups. Alternatively, the detection sequence set is determined according to the number of groups. Alternatively, the detection sequence set is determined according to the WUS.

In some embodiments, the terminal determines the number of groups according to configuration information about the number of groups. The number of groups is at least one of the following: the number of groups corresponding to the terminal in a paging occasion (PO) corresponding to the WUS, the number of terminal groups corresponding to the same time-frequency resource position, or the number of terminal groups corresponding to the same time domain resource position.

In some embodiments, correspondence between the sequence set and the group index is preset. Optionally, when there are multiple time domain resource positions, the various time domain resource positions have different sequence sets.

This embodiment of the present disclosure provides a wake up signal receiving method. A resource position where a WUS is positioned is determined according to configured position information. Then, a signal in the resource position is received and detected. This implements the reception of a group wake up signal, and avoids unnecessary PDCCH detection processes of a terminal, thereby reducing the power consumption of the terminal effectively.

Third Embodiment

Figure 3:
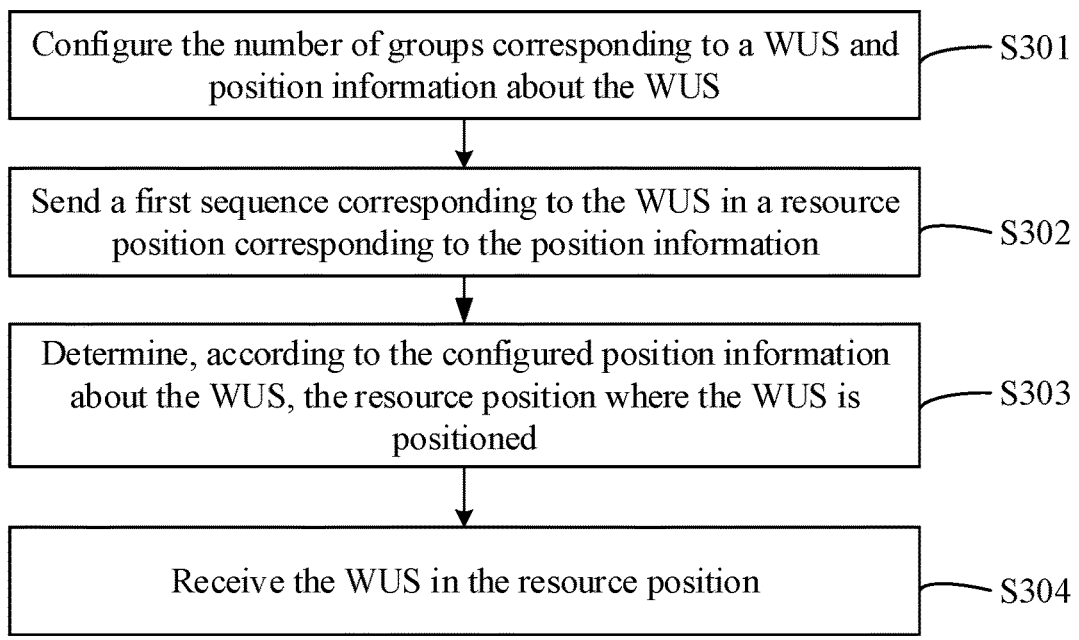
FIG. 3 is a flowchart of a wake up signal transmission method according to a third embodiment of the present disclosure.

Referring to FIG. 3, FIG. 3 is a flowchart of a wake up signal transmission method according to an embodiment of the present disclosure. The method includes steps S301 to S304 described below.

In step S301, a base station configures the number of groups corresponding to a wake up signal (WUS) and position information about the WUS.

In step S302, the base station sends a first sequence corresponding to the WUS in a resource position corresponding to the position information.

In step S303, a terminal determines, according to the configured position information about the WUS, the resource position where the WUS is positioned.

In step S304, the terminal receives the WUS in the resource position.

In some embodiments, the number of groups is at least one of the following: the number of groups corresponding to the terminal in a paging occasion (PO) corresponding to the WUS, the number of terminal groups corresponding to the same time-frequency resource position, or the number of terminal groups corresponding to the same time domain resource position.

In some embodiments, the resource position corresponding to the position information may include any one of the following: a resource position determined according to the position information; a resource position determined according to at least the position information and a group index corresponding to the WUS; or a resource position determined according to at least the position information, a group index corresponding to the WUS, and a cell identifier.

In some embodiments, the time domain position information may include at least one of the following: a first time offset, a second time offset, a third time offset or a fourth time offset.

In some embodiments, in the case where the time domain position information includes the first time offset and the second time offset, the first time offset is used for DRX, and the second time offset is used for eDRX; or in the case where the time domain position information includes the first time offset, the second time offset and the third time offset, the first time offset is used for DRX and the second time offset and the third time offset are used for eDRX, or the first time offset and the second time offset are used for DRX and the third time offset is used for eDRX; or in the case where the time domain position information includes the first time offset, the second time offset, the third time offset and the fourth time offset, the first time offset and the second time offset are used for DRX, and the third time offset and the fourth time offset are used for eDRX.

In some embodiments, the frequency domain position information may include at least one of the following: a first starting resource block index, a second starting resource block index, a third starting resource block index, a first frequency domain offset or a second frequency domain offset.

In some embodiments, a first sequence is a corresponding sequence selected from a sequence set according to a sent WUS combination.

In some embodiments, correspondence between the sequence set and the WUS combination is preset. The correspondence is determined according to the number of groups. Alternatively, the correspondence is determined according to the maximum number of groups. Optionally, when there are at least two time domain resource positions, various time domain resource positions may be configured with different sequence sets.

In some embodiments, the WUS may include at least one of the following: a group WUS or a normal WUS. The group WUS is a WUS corresponding to a group terminal in a PO. The normal WUS is a WUS corresponding to each terminal in the PO.

This embodiment of the present disclosure provides a wake up signal transmission method. A base station configures the number of groups corresponding to a WUS and position information about the WUS. Then, a first sequence corresponding to the WUS is sent in a resource position corresponding to the position information. A terminal determines, according to the configured position information about the WUS, the resource position where the WUS is positioned. Then, the signal in the resource position is received. This implements the configuration, sending and reception of a group wake up signal, and avoids unnecessary PDCCH detection processes of the terminal, thereby reducing the power consumption of the terminal effectively.

Fourth Embodiment

Specific Embodiment One

It is assumed that the number of groups is defined such that the number of groups corresponding to a terminal in each PO is X. That is, there are X group WUSs before a PO.

Example 1

It is assumed that configured time domain position information includes a first time offset, or a first time offset and a second time offset that that have the same value; and configured frequency domain position information is a first starting resource block index.

A base station obtains, according to the first time offset and a length of a WUS search space, a time domain starting position for sending a WUS; and obtains, according to the first starting resource block index, a first frequency domain position for sending a WUS. The base station sends a group WUS in the first time domain starting position and the first frequency domain position. The number of group WUSs that may be sent is X.

Example 2

It is assumed that configured time domain position information includes a first time offset and a second time offset, and configured frequency domain position information is a first starting resource block index. The first time offset and the second time offset correspond to different values.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/2.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is X/2.

Example 3

It is assumed that configured time domain position information includes a first time offset, a second time offset and a third time offset, and configured frequency domain position information is a first starting resource block index. The first time offset and the second time offset have different values.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/3.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is X/3.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is X/3.

Example 4

It is assumed that configured time domain position information includes a first time offset, a second time offset, a third time offset and a fourth time offset; and configured frequency domain position information is a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/4.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is X/4.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is X/4.

The base station obtains, according to the fourth time offset and the length of the WUS search space, a fourth time domain position for sending a WUS; and obtains, according to the first starting resource block index, the first frequency domain position for sending a WUS. The base station sends a group WUS in the fourth time domain position and the first frequency domain position. The number of group WUSs that may be sent is X/4.

Example 5

It is assumed that configured time domain position information includes a first time offset, and the configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is X/2.

Example 6

It is assumed that configured time domain position information includes a first time offset and a second time offset, and configured frequency domain position information includes a first starting resource block index and a second resource block index. The first time offset and the second time offset have different values.

It is assumed that the configured time domain position information includes the first time offset, and the configured frequency domain position information includes the first starting resource block index and a second starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/4.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is X/4.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is X/4.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is X/4.

Example 7

It is assumed that configured time domain position information includes a first time offset, or a first time offset and a second time offset that have the same value.

A base station obtains, according to the first time offset and a length of a WUS search space, a time domain starting position for sending a WUS. The base station sends a group WUS in the first time domain starting position and a first frequency domain position. The number of group WUSs that may be sent is X.

Example 8

It is assumed that configured time domain position information includes a first time offset and a second time offset. The first time offset and the second time offset correspond to different values.

A base station obtains, according to the first time offset and a length of a WUS search space, a first time domain position for sending a WUS. The base station sends a group WUS in the first time domain position. The number of group WUSs that may be sent is X/2.

The base station obtains, according to the second time offset and the length of the WUS search space, a second time domain position for sending a WUS. The base station sends a group WUS in the second time domain position. The number of group WUSs that may be sent is X/2.

Example 9

It is assumed that configured time domain position information includes a first time offset, a second time offset and a third time offset. The first time offset and the second time offset have different values.

A base station obtains, according to the first time offset and a length of a WUS search space, a first time domain position for sending a WUS. The base station sends a group WUS in the first time domain position. The number of group WUSs that may be sent is X/3.

The base station obtains, according to the second time offset and the length of the WUS search space, a second time domain position for sending a WUS. The base station sends a group WUS in the second time domain position. The number of group WUSs that may be sent is X/3.

The base station obtains, according to the third time offset and the length of the WUS search space, a third time domain position for sending a WUS. The base station sends a group WUS in the third time domain position. The number of group WUSs that may be sent is X/3.

Example 10

It is assumed that configured time domain position information includes a first time offset, a second time offset, a third time offset and a fourth time offset. The first time offset, the second time offset, the third time offset and the fourth time offset all correspond to different values.

A base station obtains, according to the first time offset and a length of a WUS search space, a first time domain position for sending a WUS. The base station sends a group WUS in the first time domain position. The number of group WUSs that may be sent is X/4.

The base station obtains, according to the second time offset and the length of the WUS search space, a second time domain position for sending a WUS. The base station sends a group WUS in the second time domain position. The number of group WUSs that may be sent is X/4.

The base station obtains, according to the third time offset and the length of the WUS search space, a third time domain position for sending a WUS. The base station sends a group WUS in the third time domain position. The number of group WUSs that may be sent is X/4.

The base station obtains, according to the fourth time offset and the length of the WUS search space, a fourth time domain position for sending a WUS. The base station sends a group WUS in the fourth time domain position. The number of group WUSs that may be sent is X/4.

Example 11

In an MTC system, it is assumed that configured time domain position information includes a first time offset and a second time offset. The first time offset and the second time offset correspond to the same value. It is assumed that a loop is positioned in narrow band K, resource block indexes in the narrow band are k0, k1, k2, k3, k4 and k5, a first frequency domain position is fixed to k0 and k1, a second frequency domain position is fixed to k2 and k3, and a third frequency domain position is fixed to k4 and k5.

A base station obtains, according to the first time offset/or the second time offset and a length of a WUS search space, a first time domain position for sending a WUS. The base station sends a group WUS in the first time domain position and the first frequency domain position, where the number of group WUSs that may be sent is X/3. The base station sends a group WUS in the first time domain position and the second frequency domain position, where the number of group WUSs that may be sent is X/3. The base station sends a group WUS in the first time domain position and the third frequency domain position, where the number of group WUSs that may be sent is X/3.

A WUS sent in a resource position is determined according to a group index corresponding to the WUS. Using the case where X=6 as an example, group WUSs are WUS 1, WUS 2, WUS 3, WUS 4, WUS 5 and WUS 6. WUS 1 and WUS 2 are sent in the first time domain position and the first frequency domain position. WUS 3 and WUS 4 are sent in the first time domain position and the second frequency domain position. WUS 5 and WUS 6 are sent in the first time domain position and the third frequency domain position.

Example 12

It is assumed that configured time domain position information includes a first time offset and a second time offset, and configured frequency domain position information includes a first starting resource block index. The first time offset and the second time offset correspond to different values.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is X/2.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is X/2.

A WUS sent in a resource position is determined according to a group index corresponding to the WUS. Using the case where X=4 as an example, group WUSs are WUS 1, WUS 2, WUS 3 and WUS 4. WUS 1 and WUS 2 are sent in the first time domain position and the first frequency domain position, and WUS 3 and WUS 4 are sent in the second time domain position and the first frequency domain position. Alternatively, WUS 1 and WUS 3 are sent in the first time domain position and the first frequency domain position, and WUS 2 and WUS 4 are sent in the second time domain position and the first frequency domain position. Alternatively, WUS 1 and WUS 4 are sent in the first time domain position and the first frequency domain position, and WUS 2 and WUS 3 are sent in the second time domain position and the first frequency domain position.

Specific Embodiment Two

It is assumed that the number of groups is defined to the number of terminal groups in the same time domain resource. That is, there are Y group WUSs in each time domain resource position.

Example 1

It is assumed that configured time domain position information includes a first time offset, and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y.

Example 2

It is assumed that configured time domain position information includes a first time offset and a second time offset, and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y.

Example 3

It is assumed that configured time domain position information includes a first time offset, a second time offset and a third time offset, and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is Y.

Example 4

It is assumed that configured time domain position information includes a first time offset, a second time offset, a third time offset and a fourth time offset; and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is Y.

The base station obtains, according to the fourth time offset and the length of the WUS search space, a fourth time domain position for sending a WUS; and obtains, according to the first starting resource block index, the first frequency domain position for sending a WUS. The base station sends a group WUS in the fourth time domain position and the first frequency domain position. The number of group WUSs that may be sent is Y.

Example 5

It is assumed that configured time domain position information includes a first time offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Y/2.

Example 6

It is assumed that configured time domain position information includes a first time offset, and configured frequency domain position information includes a first starting resource block index and a second starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Y/2.

The base station determines, according to a group index corresponding to the group WUS, whether the WUS is positioned in the first frequency domain position or the second frequency domain position. Assuming that Y=4, that is, group WUSs correspond to WUS 1, WUS 2, WUS 3 and WUS 4, WUS 1 and WUS 2 correspond to the first time domain position and the first frequency domain position, and WUS 3 and WUS 4 correspond to the first time domain position and the second frequency domain position.

Example 7

It is assumed that configured time domain position information includes a first time offset and a second offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Y/2.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y/2.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is Y/2.

Example 8

It is assumed that configured time domain position information includes a first time offset and a second offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Y/2.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y/2.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is Y/2.

The base station determines, according to a group index corresponding to the group WUS, whether the WUS is positioned in the first frequency domain position or the second frequency domain position. Assuming that Y=4, that is, group WUSs correspond to WUS 1, WUS 2, WUS 3 and WUS 4 one example is that WUS 1 and WUS 2 correspond to the first time domain position and the first frequency domain position; and WUS 3 and WUS 4 correspond to the first time domain position and the second frequency domain position; and WUS 1 and WUS 2 correspond to the second time domain position and the first frequency domain position, and WUS 3 and WUS 4 correspond to the second time domain position and the second frequency domain position.

Example 9

It is assumed that configured time domain position information includes a first time offset, a second offset and a third time offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Y/2.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Y/2.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Y/2.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is Y/2.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is Y/2.

The base station obtains, according to the third time offset and the length of the WUS search space, a third time domain position for sending a WUS; and obtains, according to the second starting resource block index, the second frequency domain position for sending a WUS. The base station sends a group WUS in the third time domain position and the second frequency domain position. The number of group WUSs that may be sent is Y/2.

Example 10

It is assumed that configured time domain position information includes a first time offset. A base station obtains, according to the first time offset and a length of a WUS search space, a first time domain position for sending a WUS. The base station sends a group WUS in the first time domain position. The number of group WUSs that may be sent is Y.

Example 11

It is assumed that configured time domain position information includes a first time offset and a second time offset. The first time offset and the second time offset correspond to different values.

A base station obtains, according to the first time offset and a length of a WUS search space, a first time domain position for sending a WUS. The base station sends a group WUS in the first time domain position. The number of group WUSs that may be sent is Y.

The base station obtains, according to the second time offset and the length of the WUS search space, a second time domain position for sending a WUS. The base station sends a group WUS in the second time domain position. The number of group WUSs that may be sent is Y.

Example 12

It is assumed that configured time domain position information includes a first time offset, a second time offset and a third time offset. The first time offset, the second time offset and the third time offset correspond to different values.

A base station obtains, according to the first time offset and a length of a WUS search space, a first time domain position for sending a WUS. The base station sends a group WUS in the first time domain position. The number of group WUSs that may be sent is Y.

The base station obtains, according to the second time offset and the length of the WUS search space, a second time domain position for sending a WUS. The base station sends a group WUS in the second time domain position. The number of group WUSs that may be sent is Y.

The base station obtains, according to the third time offset and the length of the WUS search space, a third time domain position for sending a WUS. The base station sends a group WUS in the third time domain position. The number of group WUSs that may be sent is Y.

Example 13

It is assumed that configured time domain position information includes a first time offset, a second time offset, a third time offset and a fourth time offset. The first time offset, the second time offset, the third time offset and the fourth time offset correspond to different values.

A base station obtains, according to the first time offset and a length of a WUS search space, a first time domain position for sending a WUS. The base station sends a group WUS in the first time domain position. The number of group WUSs that may be sent is Y.

The base station obtains, according to the second time offset and the length of the WUS search space, a second time domain position for sending a WUS. The base station sends a group WUS in the second time domain position. The number of group WUSs that may be sent is Y.

The base station obtains, according to the third time offset and the length of the WUS search space, a third time domain position for sending a WUS. The base station sends a group WUS in the third time domain position. The number of group WUSs that may be sent is Y.

The base station obtains, according to the fourth time offset and the length of the WUS search space, a fourth time domain position for sending a WUS. The base station sends a group WUS in the fourth time domain position. The number of group WUSs that may be sent is Y.

Specific Embodiment Three

It is assumed that the number of groups is defined to the number of terminal groups in the same frequency domain resource position. That is, there are Z group WUSs in each frequency domain resource position.

Example 1

It is assumed that configured time domain position information includes a first time offset, and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Z.

Example 2

It is assumed that configured time domain position information includes a first time offset and a second time offset, and configured frequency domain position information includes a first starting resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Z.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Z.

Example 3

It is assumed that configured time domain position information includes a first time offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Z.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Z.

Example 6

It is assumed that configured time domain position information includes a first time offset and a second offset, and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Z.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Z.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Z.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is Z.

Example 7

It is assumed that configured time domain position information includes a first time offset, a second offset and a third time offset; and configured frequency domain position information includes a first starting resource block index and a second resource block index.

A base station obtains, according to the first time offset and a length of a WUS search space, a first time domain position for sending a WUS; and obtains, according to the first starting resource block index, a first frequency domain position for sending a WUS. The base station sends a group WUS in the first time domain position and the first frequency domain position. The number of group WUSs that may be sent is Z.

The base station obtains, according to the first time offset and the length of the WUS search space, the first time domain position for sending a WUS; and obtains, according to the second starting resource block index, a second frequency domain position for sending a WUS. The base station sends a group WUS in the first time domain position and the second frequency domain position. The number of group WUSs that may be sent is Z.

The base station obtains, according to the second time offset and the length of the WUS search space, a second time domain position for sending a WUS; and obtains, according to the first starting resource block index, the first frequency domain position for sending a WUS. The base station sends a group WUS in the second time domain position and the first frequency domain position. The number of group WUSs that may be sent is Z.

The base station obtains, according to the second time offset and the length of the WUS search space, the second time domain position for sending a WUS; and obtains, according to the second starting resource block index, the second frequency domain position for sending a WUS. The base station sends a group WUS in the second time domain position and the second frequency domain position. The number of group WUSs that may be sent is Z.

The base station obtains, according to the third time offset and the length of the WUS search space, a third time domain position for sending a WUS; and obtains, according to the first starting resource block index, the first frequency domain position for sending a WUS. The base station sends a group WUS in the third time domain position and the first frequency domain position. The number of group WUSs that may be sent is Z.

The base station obtains, according to the third time offset and the length of the WUS search space, a third time domain position for sending a WUS; and obtains, according to the second starting resource block index, the second frequency domain position for sending a WUS. The base station sends a group WUS in the third time domain position and the second frequency domain position. The number of group WUSs that may be sent is Z.

Fifth Embodiment

Example 1

It is assumed that WUSs that may be sent include WUS 1 and WUS 2, and a preset sequence set is {sequence 1, sequence 2 and sequence 3}. The first sequence is a corresponding sequence selected from the sequence set according to a sent WUS combination. Specific cases are described below.

A sent WUS is WUS 1, and the first sequence is the sequence 1.

The sent WUS is WUS 2, and the first sequence is the sequence 2.

The sent WUSs include WUS 1 and WUS 2, and the first sequence is the sequence 3.

Example 2

It is assumed that WUSs that may be sent include WUS 1, WUS 2 and WUS 3, and a preset sequence set is {sequence 1, sequence 2, sequence 3, sequence 4, sequence 5, sequence 6 and sequence 7}. The first sequence is a corresponding sequence selected from the sequence set according to a sent WUS combination. Specific cases are described below.

The sent WUS is WUS 1, and the first sequence is the sequence 1.

The sent WUS is WUS 2, and the first sequence is the sequence 2.

The sent WUS is WUS 3, and the first sequence is the sequence 3.

The sent WUSs include WUS 1 and WUS 2, and the first sequence is the sequence 4.

The sent WUSs include WUS 1 and WUS 3, and the first sequence is the sequence 5.

The sent WUSs include WUS 2 and WUS 3, and the first sequence is the sequence 6.

The sent WUSs include WUS 1, WUS 2 and WUS 3, and the first sequence is the sequence 7.

Example 3

It is assumed that WUSs that may be sent includes group WUS 1, group WUS 2, group WUS 3 and group WUS 4, a sequence set is {sequence 1, sequence 2, sequence 3, sequence 4, sequence 5, sequence 6, sequence 7, sequence 8, sequence 9, sequence 10, sequence 11, sequence 12, sequence 13, sequence 14 and sequence 15}. The first sequence is a corresponding sequence selected from the sequence set according to a sent WUS combination. Specific cases are described below.

The sent WUS is WUS 1, and the first sequence is the sequence 1.

The sent WUS is WUS 2, and the first sequence is the sequence 2.

The sent WUS is WUS 3, and the first sequence is the sequence 3.

The sent WUS is WUS 4, and the first sequence is the sequence 4.

The sent WUSs include WUS 1 and WUS 2, and the first sequence is the sequence 5.

The sent WUSs include WUS 1 and WUS 3, and the first sequence is the sequence 6.

The sent WUSs includes WUS 2 and WUS 3, and the first sequence is the sequence 7.

The sent WUSs include WUS 1 and WUS 4, and the first sequence is the sequence 8.

The sent WUSs include WUS 2 and WUS 4, and the first sequence is the sequence 9.

The sent WUSs include WUS 3 and WUS 4, and the first sequence is the sequence 10.

The sent WUSs include WUS 1, WUS 2 and WUS 3, and the first sequence is the sequence 11.

The sent WUSs include WUS 1, WUS 3 and WUS 4, and the first sequence is the sequence 12.

The sent WUSs include WUS 1, WUS 2 and WUS 4, and the first sequence is the sequence 13.

The sent WUSs include WUS 1, WUS 2 and WUS 4, and the first sequence is the sequence 14.

The sent WUSs include WUS 1, WUS 2, WUS 3 and WUS 4, and the first sequence is the sequence 15.

Example 4

It is assumed that a sequence set is {sequence 1, sequence 2, sequence 3, sequence 4, sequence 5, sequence 6, sequence 7, sequence 8, sequence 9, sequence 10, sequence 11, sequence 12, sequence 13, sequence 14 and sequence 15}. The first sequence is a corresponding sequence selected from the sequence set according to a sent WUS combination. Specific cases are described below.

The sent WUS is WUS 1, and the first sequence is the sequence 1.

The sent WUS is WUS 2, and the first sequence is the sequence 2.

The sent WUS is WUS 3, and the first sequence is the sequence 3.

The sent WUS is WUS 4, and the first sequence is the sequence 4.

Sent WUSs include WUS 1 and WUS 2, and the first sequence is the sequence 5.

The sent WUSs include WUS 1 and WUS 3, and the first sequence is the sequence 6.

The sent WUSs include WUS 2 and WUS 3, and the first sequence is the sequence 7.

The sent WUSs include WUS 1 and WUS 4, and the first sequence is the sequence 8.

The sent WUSs include WUS 2 and WUS 4, and the first sequence is the sequence 9.

The sent WUSs include WUS 3 and WUS 4, and the first sequence is the sequence 10.

The sent WUSs include WUS 1, WUS 2 and WUS 3, and the first sequence is the sequence 11.

The sent WUSs include WUS 1, WUS 3 and WUS 4, and the first sequence is the sequence 12.

The sent WUSs include WUS 1, WUS 2 and WUS 4, and the first sequence is the sequence 13.

The sent WUSs include WUS 1, WUS 2 and WUS 4, and the first sequence is the sequence 14.

The sent WUSs are other than the foregoing combinations, and the first sequence is the sequence 15.

Example 5

It is assumed that a sequence set is {sequence 1, sequence 2, sequence 3, sequence 4, sequence 5, sequence 6, sequence 7, sequence 8, sequence 9, sequence 10 and sequence 11}. The first sequence is a corresponding sequence selected from the sequence set according to a sent WUS combination. Specific cases are described below.

The sent WUS is WUS 1, and the first sequence is the sequence 1.

The sent WUS is WUS 2, and the first sequence is the sequence 2.

The sent WUS is WUS 3, and the first sequence is the sequence 3.

The sent WUS is WUS 4, and the first sequence is the sequence 4.

Sent WUSs include WUS 1 and WUS 2, and the first sequence is the sequence 5.

The sent WUSs include WUS 1 and WUS 3, and the first sequence is the sequence 6.

The sent WUSs include WUS 2 and WUS 3, and the first sequence is the sequence 7.

The sent WUSs include WUS 1 and WUS 4, and the first sequence is the sequence 8.

The sent WUSs include WUS 2 and WUS 4, and the first sequence is the sequence 9.

The sent WUSs include WUS 3 and WUS 4, and the first sequence is the sequence 10.

The sent WUSs include other than the foregoing combinations, and the first sequence is the sequence 11.

Example 6

It is assumed that there are K sequences in a sequence set, and there are N WUS combinations. When K>N, each WUS combination corresponds to a respective sequence. When K<N, not each WUS combination has a respective sequence. This requires some WUS combinations to correspond to the same sequence, and the WUS combinations corresponding to the same sequence are selected according to the following rules: (1) WUS combinations having similar numbers of WUSs; or (2) WUS combinations having great numbers of WUSs.

In the preceding examples, correspondence between a sequence set and a WUS combination is preset. The case where WUS 1 corresponds to sequence 1 and WUS 2 corresponds to sequence 2 is only an optional example, but not a limitation to the correspondence. In examples 1 to 3, the correspondence is determined according to the number of groups. In examples 4 to 6, the correspondence is determined according to the maximum number of groups.

In the preceding example, a WUS is a group WUS and/or a normal WUS.

Sixth Embodiment

It is assumed that configured time domain position information includes a first time offset and a second time offset, and configured frequency domain position information is a first starting resource block index. The first time offset and the second time offset correspond to different values. It is assumed that the number of group terminals in the same time domain resource position is 2, that is, there are 2 group WUSs in the same time domain resource position.

Example 1

The number of groups is 2, so WUSs that may be sent include WUS 1 and WUS 2. It is assumed that a preset sequence set is {sequence 1, sequence 2 and sequence 3}. A first sequence is a corresponding sequence selected from the sequence set according to a sent WUS combination. Specific cases are described below.

The sent WUS is WUS 1, and the first sequence is the sequence 1.

The sent WUS is WUS 2, and the first sequence is the sequence 2.

The sent WUSs include WUS 1 and WUS 2, and the first sequence is the sequence 3.

In this embodiment of the present disclosure, WUSs in different time domain positions correspond to the same sequence set.

Example 2

The number of groups is 2, so WUSs that may be sent includes WUS 1 and WUS 2. It is assumed that in a first time domain position determined according to the first time offset, a preset sequence set is {sequence 11, sequence 12 and sequence 13}; and in a second time domain position determined according to the second time offset, a preset sequence set is {sequence 21, sequence 22 and sequence 23}. A first sequence is a corresponding sequence selected from the sequence set according to a sent WUS combination.

Specifically, in the first time domain position determined according to the first time offset, there are the cases described below.

The sent WUS is WUS 1, and the first sequence is the sequence 11.

The sent WUS is WUS 2, and the first sequence is the sequence 12.

The sent WUSs include WUS 1 and WUS 2, and the first sequence is sequence 13.

In the second time domain position determined according to the second time offset, there are the cases described below.

The sent WUS is WUS 1, and the first sequence is the sequence 21.

The sent WUS is WUS 2, and the first sequence is the sequence 22.

The sent WUSs include WUS 1 and WUS 2, and the first sequence is the sequence 23.

In this embodiment of the present disclosure, WUSs in different time domain positions correspond to different sequence sets. Certainly, WUSs in different frequency positions may correspond to different sequence sets.

Seventh Embodiment

Specific Embodiment One

A terminal determines, according to at least configured position information about a WUS, a resource position where a WUS is positioned. The terminal receives the signal in the resource position.

Example 1

It is assumed that a first time offset and a second time offset are configured, and a first starting resource block index is configured to RB #1.

A terminal in a DRX mode determines a position of a corresponding WUS in a search space according to the first time offset and a length of a WUS search space. A frequency domain position of the corresponding WUS is determined to be RB #1 and RB #2 according to the first starting resource block index.

A terminal in an eDRX mode determines a position of a corresponding WUS in the search space according to the second time offset and the length of the WUS search space. A frequency domain position of the corresponding WUS is determined to be RB #1 and RB #2 according to the first starting resource block index.

Example 2

It is assumed that a first time offset, a second time offset and a third time offset are configured, and a first starting resource block index is configured to RB #1.

A terminal in a DRX mode determines a position of a corresponding WUS in a search space according to the first time offset and a length of the WUS search space. A frequency domain position of the corresponding WUS is determined to be RB #1 and RB #2 according to the first starting resource block index.

A terminal in an eDRX mode determines, according to a second preset condition, whether to use the second time offset or the third time offset. A terminal determining to use the second time offset determines a position of a corresponding WUS in the search space according to the second time offset and the length of the WUS search space. A terminal determining to use the third time offset determines a position of a corresponding WUS in the search space according to the third time offset and the length of the WUS search space. A frequency domain position of the corresponding WUS is determined to be RB #1 and RB #2 according to the first starting resource block index.

Example 3

It is assumed that a first time offset, a second time offset and a third time offset are configured, and a first starting resource block index is configured to RB #1.

A terminal in a DRX mode determines, according to a first preset condition, whether to use the first time offset or the second time offset. A terminal determining to use the first time offset determines a position of a corresponding WUS in a search space according to the first time offset and a length of the WUS search space. A terminal determining to use the second time offset determines a position of a corresponding WUS in the search space according to the second time offset and the length of the WUS search space. A frequency domain position of the corresponding WUS is determined to be RB #1 and RB #2 according to the first starting resource block index.

A terminal in an eDRX mode determines a position of a corresponding WUS in a search space according to the second time offset and the length of the WUS search space. A frequency domain position of the corresponding WUS is determined to be RB #1 and RB #2 according to the first starting resource block index.

Example 4

It is assumed that a first time offset, a second time offset, a third time offset and a fourth time offset are configured, and a first starting resource block index is configured to RB #1.

A terminal in a DRX mode determines, according to a first preset condition, whether to use the first time offset or the second time offset. A terminal determining to use the first time offset determines a position of a corresponding WUS in a search space according to the first time offset and a length of the WUS search space. A terminal determining to use the second time offset determines a position of a corresponding WUS in the search space according to the second time offset and the length of the WUS search space. A frequency domain position of the corresponding WUS is determined to be RB #1 and RB #2 according to the first starting resource block index.

A terminal in an eDRX mode determines, according to a second preset condition, whether to use the third time offset or the fourth time offset. A terminal determining to use the third time offset determines a position of a corresponding WUS in a search space according to the third time offset and the length of the WUS search space. A terminal determining to use the fourth time offset determines a position of a corresponding WUS in the search space according to the fourth time offset and the length of the WUS search space. A frequency domain position of the corresponding WUS is determined to be RB #1 and RB #2 according to the first starting resource block index.

In the preceding examples 2 to 4, the first preset condition is one or more of terminal processing capability, signaling, a group index or a terminal identifier; and the second preset condition is one or more of terminal processing capacity, signaling, a group index and or a terminal identifier.

Example 5

It is assumed that a first time offset and a second time offset are configured, a first starting resource block index is configured to RB #1, and a second starting resource block index is configured to RB #2.

A terminal determines, according to a third preset condition, whether to use the first starting resource block index or the second starting resource block index.

A terminal in a DRX mode determines a position of a corresponding WUS in a search space according to the first time offset and a length of the WUS search space. A terminal determining to use the first starting resource block index determines, according to the first starting resource block index, a first frequency domain position of the corresponding WUS to be RB #1 and RB #2. A terminal determining to use the second starting resource block index determine, according to the second starting resource block index, a second frequency domain position of a corresponding WUS to be RB #3 and RB #4.

A terminal in an eDRX mode determines a position of a corresponding WUS in the search space according to the second time offset and the length of the WUS search space. A terminal determining to use the first starting resource block index determines, according to the first starting resource block index, a first frequency domain position of the corresponding WUS to be RB #1 and RB #2. A terminal determining to use the second starting resource block index determines, according to the second starting resource block index, a second frequency domain position of a corresponding WUS to be RB #3 and RB #4.

In the preceding example 5, the third preset condition is one or more of a group index corresponding to the terminal, or a terminal identifier.

Example 6

It is assumed that a first time offset and a second time offset are configured, a first starting resource block index is configured to RB #1, and a first frequency domain offset is configured to 2. Then, a first frequency domain position is RB #1 and RB #2, and a second frequency domain position is RB #3 and RB #4.

A terminal determines, according to a third preset condition, whether to use the first starting resource block index or the first frequency offset.

A terminal in a DRX mode determines a position of a corresponding WUS in a search space according to the first time offset and a length of a WUS search space. A terminal determining to use the first starting resource block index determines, according to the first starting resource block index, a first frequency domain position of the corresponding WUS to be RB #1 and RB #2. A terminal determining to use the first frequency offset determines, according to the first frequency offset, a second frequency domain position of a corresponding WUS to be RB #3 and RB #4.

A terminal in an eDRX mode determines a position of a corresponding WUS in the search space according to the second time offset and the length of the WUS search space. A terminal determining to use the first starting resource block index determines, according to the first starting resource block index, a first frequency domain position of the corresponding WUS to be RB #1 and RB #2. A terminal determining to use the first frequency offset determines, according to the first frequency offset, a second frequency domain position of a corresponding WUS to be RB #3 and RB #4.

In the preceding examples 5 and 6, the third preset condition is one or more of a group index corresponding to the terminal, or a terminal identifier.

In the preceding examples, the terminal receives the signal according to the determined position in the search space and frequency domain position.

Specific Embodiment Two

A terminal determines, according to at least configured position information about a WUS, a resource position where the WUS is positioned. The terminal receives the signal in the resource position.

Example 1

It is assumed that a first time offset and a second time offset are configured.

A terminal in a DRX mode determines a position of a corresponding WUS in a search space according to the first time offset and a length of the WUS search space.

A terminal in an eDRX mode determines a position of a corresponding WUS in the search space according to the second time offset and the length of the WUS search space.

Example 2

It is assumed that a first time offset, a second time offset and a third time offset are configured.

A terminal in a DRX mode determines a position of a corresponding WUS in a search space according to the first time offset and a length of the WUS search space.

A terminal in an eDRX mode determines, according to a second preset condition, whether to use the second time offset or the third time offset. A terminal determining to use the second time offset determines a position of a corresponding WUS in a search space according to the second time offset and the length of the WUS search space. A terminal determining to use the third time offset determines a position of a corresponding WUS in the search space according to the third time offset and the length of the WUS search space.

Example 3

It is assumed that a first time offset, a second time offset and a third time offset are configured.

A terminal in a DRX mode determines, according to a first preset condition, whether to use the first time offset or the second time offset. A terminal determining to use the first time offset determines a position of a corresponding WUS in a search space according to the first time offset and a length of the WUS search space. A terminal determining to use the second time offset determines a position of a corresponding WUS in the search space according to the second time offset and the length of the WUS search space.

A terminal in an eDRX mode determines a position of a corresponding WUS in a search space according to the third time offset and the length of the WUS search space.

Example 4

It is assumed that a first time offset, a second time offset, a third time offset and a fourth time offset are configured.

A terminal in a DRX mode determines, according to a first preset condition, whether to use the first time offset or the second time offset. A terminal determining to use the first time offset determines a position of a corresponding WUS in a search space according to the first time offset and a length of the WUS search space. A terminal determining to use the second time offset determines a position of a corresponding WUS in the search space according to the second time offset and the length of the WUS search space.

A terminal in an eDRX mode determines, according to a second preset condition, whether to use the third time offset or the fourth time offset. A terminal determining to use the third time offset determines a position of a corresponding WUS in a search space according to the third time offset and the length of the WUS search space. A terminal determining to use the fourth time offset determines a position of a corresponding WUS in the search space according to the fourth time offset and the length of the WUS search space.

In the preceding examples 2 to 4, the first preset condition is one or more of terminal processing capability, signaling, a group index or a terminal identifier; and the second preset condition is one or more of terminal processing capacity, signaling, a group index and or a terminal identifier.

In the preceding example, the terminal receives the signal according to the determined position in the search space and frequency domain position.

Eighth Embodiment

Specific Embodiment One

Example 1

It is assumed that a group index corresponding to a terminal is determined according to a terminal type. The terminal type refers to a terminal version. Specifically, an R15 terminal corresponds to group index 0.

Example 2

It is assumed that a group index corresponding to a terminal is determined according to a terminal type and a terminal capability. The terminal capability refers to the capability about whether a terminal supports a group WUS.

An R15 terminal and an R16 terminal that do not support the group WUS correspond to group indexes 0.

Example 3

It is assumed that a group index corresponding to a terminal is determined according to a terminal identifier and a terminal capability. The terminal capability refers to the capability about whether a terminal supports a group WUS. The following two types of terminals correspond to group indexes 0: an R16 terminal that does not support the group WUS; and some terminals among R16 terminals that support the group WUS, preferably, a terminal with a terminal identifier being less than a threshold A, and a terminal with a terminal identifier modulo B being equal to C, where A, B, and C are each a preset positive integer greater than 0, or calculated according to a configured scale factor. For example, assuming that the configured scale factor is 10%, the value of A is obtained by rounding (10%× the maximum value of the terminal identifier).

Example 4

It is assumed that a group index corresponding to a terminal is determined according to a terminal type, a terminal identifier and a terminal capability. The terminal capability refers to the capability about whether a terminal supports a group WUS. The three types of terminals described below correspond to group indexes 0: an R15 terminal; an R16 terminal that does not support the group WUS; and some terminals of R16 terminals that support the group WUS and, preferably, a terminal with a terminal identifier being less than threshold A, and a terminal with a terminal identifier modulo B being equal to C, where A, B and C are each a preset positive integer greater than 0, or calculated according to a configured scale factor.

Example 5

It is assumed that a group index corresponding to a terminal is determined according to a terminal capability, the number of groups and a terminal identifier.

An R16 terminal that does not support a group WUS corresponds to a group index 0. A group index corresponding to an R16 terminal that supports the group WUS is obtained by adding D to a terminal identifier modulo the number of groups, where D is a positive integer greater than 0.

Example 6

It is assumed that a group index corresponding to a terminal is determined according to a configured resource, the number of groups, a terminal capability and a terminal identifier. An R16 terminal that does not support a group WUS corresponds to a group index 0. For an R16 terminal that supports the group WUS, the second number of groups in a resource position is determined according to the number of groups and a configured resource; assuming that the number of groups is the number of terminal groups in a PO and is equal to 4, and two time domain resource positions are configured, the second number of groups is 2, and a group index is obtained by adding D to a terminal identifier modulo the second number of groups.

In the preceding example, a WUS corresponding to group index 0 is an R15 WUS. It is assumed that the R15 WUS corresponds to group index 0. Certainly, the group index may be other fixed values.

Specific Embodiment Two

Example 1

A detection sequence set is determined according to the number of groups and a WUS. It is assumed that the number of groups is 2, that is, there are WUS 1 and WUS 2.

Assuming that a terminal A corresponds to WUS 1, a detection sequence set corresponding to the terminal A includes sequence 1 and sequence 3.

Assuming that a terminal B corresponds to WUS 2, a detection sequence set corresponding to the terminal B includes sequence 2 and sequence 3.

Example 2

A detection sequence set is determined according to the number of groups and group index t. It is assumed that the number of groups is 2.

Assuming that t of a terminal A is equal to 1, a detection sequence set corresponding to the terminal A includes sequence 1 and sequence 3.

Assuming that t of a terminal B is equal to 2, a detection sequence set corresponding to the terminal B includes sequence 2 and sequence 3.

Example 3

A detection sequence set is determined according to the number of groups and a WUS. It is assumed that the number of groups is 3, that is, there are WUS 1, WUS 2 and WUS 3.

Assuming that a terminal A corresponds to WUS 1, a detection sequence set corresponding to the terminal A includes sequence 1, sequence 4, sequence 5 and sequence 7.

Assuming that a terminal B corresponds to WUS 2, a detection sequence set corresponding to the terminal B includes sequence 2, sequence 4, sequence 6 and sequence 7.

Assuming that a terminal C corresponds to WUS 3, a detection sequence set corresponding to the terminal C includes sequence 3, sequence 5, sequence 6 and sequence 7.

Example 4

A detection sequence set is determined according to the number of groups and group index t. It is assumed that the number of groups is 3.

Assuming that t of a terminal A is equal to 1, the terminal A determines sequence 1, sequence 4, sequence 5 and sequence 7 as detection sequences.

Assuming that t of a terminal B is equal to 2, the terminal B determines sequence 2, sequence 4, sequence 6 and sequence 7 as detection sequences.

Assuming that t of a terminal c is equal to 3, the terminal c determines sequence 3, sequence 5, sequence 6 and sequence 7 as detection sequences.

Example 5

A detection sequence set is determined according to the number of groups and a WUS. It is assumed that the number of groups is 4, that is, there are WUS 1, WUS 2, WUS 3 and WUS 4.

Assuming that a terminal A corresponds to WUS 1, a detection sequence set corresponding to the terminal A includes sequence 1, sequence 5, sequence 6, sequence 8, sequence 11, sequence 12, sequence 13 and sequence 15.

Assuming that a terminal B corresponds to WUS 2, a detection sequence set corresponding to the terminal B includes sequence 2, sequence 5, sequence 7, sequence 9, sequence 11, sequence 13, sequence 14 and sequence 15.

Assuming that a terminal C corresponds to WUS 3, a detection sequence set corresponding to the terminal C includes sequence 3, sequence 6, sequence 7, sequence 10, sequence 11, sequence 12, sequence 14 and sequence 15.

Assuming that a terminal D corresponds to WUS 4, a detection sequence set corresponding to the terminal D includes sequence 4, sequence 8, sequence 9, sequence 10, sequence 11, sequence 12, sequence 14 and sequence 15.

Example 6

A detection sequence set is determined according to the number of groups and group index t. It is assumed that the number of groups is 4.

Assuming that t of a terminal A is equal to 1, the terminal A determines sequence 1, sequence 5, sequence 6, sequence 8, sequence 11, sequence 12, sequence 13 and sequence 15 as a detection sequence set.

Assuming that t of a terminal B is equal to 2, the terminal B determines sequence 2, sequence 5, sequence 7, sequence 9, sequence 11, sequence 13, sequence 14 and sequence 15 as a detection sequence set.

Assuming that t of a terminal c is equal to 3, the terminal c determines sequence 3, sequence 6, sequence 7, sequence 10, sequence 11, sequence 12, sequence 14 and sequence 15 as a detection sequence set.

Assuming that t of a terminal d is equal to 4, the terminal d determines sequence 4, sequence 8, sequence 9, sequence 10, sequence 11, sequence 12, sequence 14 and sequence 15 as a detection sequence set.

Example 7

A detection sequence set is determined according to the number of groups and group index t. It is assumed that the number of groups is 2.

It is assuming that t of a terminal A is equal to 1. In a first time domain position, the terminal A determines sequence 11 and sequence 13 as a detection sequence set. In a second time domain position, the terminal A determines sequence 21 and sequence 23 as a detection sequence set.

It is assumed that t of a terminal B is equal to 2. In the first time domain position, the terminal B determines sequence 12 and sequence 13 as a detection sequence set. In the second time domain position, the terminal B determines sequence 22 and sequence 23 as a detection sequence set.

Ninth Embodiment

Figure 4:
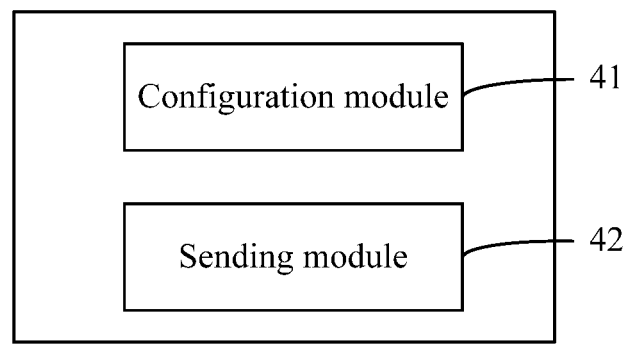
FIG. 4 is a schematic diagram of a wake up signal sending apparatus according to a ninth embodiment of the present disclosure.

An embodiment of the present disclosure provides a wake up signal sending apparatus. Referring to FIG. 4, the wake up signal sending apparatus includes a configuration module 41 and a sending module 42.

The configuration module 41 is configured to configure the number of groups corresponding to a wake up signal (WUS) and position information about the WUS.

The sending module 42 is configured to send a first sequence corresponding to the WUS in a resource position corresponding to the position information.

In some embodiments, the number of groups is at least one of the following: the number of groups corresponding to a terminal in a paging occasion (PO) corresponding to the WUS, the number of terminal groups corresponding to the same time-frequency resource position, or the number of terminal groups corresponding to the same time domain resource position.

In some embodiments, the resource position corresponding to the position information may include any one of the following: a resource position determined according to the position information, a resource position determined according to at least the position information and a group index corresponding to the WUS, or a resource position determined according to at least the position information, a group index corresponding to the WUS, and a cell identifier.

In some embodiments, the resource position may include at least one of the following: a time domain resource position indicated by the position information, or a frequency domain resource position indicated by the position information. That is, resource positions may be divided into a time domain resource position, a frequency domain resource position and a time-frequency domain resource position according to the difference between time domain and frequency domain. The time domain resource position is indicated by time domain position information. The frequency domain resource position is indicated by frequency domain position information. The time-frequency domain resource position is jointly indicated by the time domain resource position and the frequency domain resource position. Correspondingly, the position information also includes at least one of the following: the time domain position information or the frequency domain position information.

In some embodiments, the time domain position information may include at least one of the following: a first time offset, a second time offset, a third time offset or a fourth time offset.

In some embodiments:
in the case where the time domain position information includes the first time offset and the second time offset, the first time offset is used for DRX, and the second time offset is used for eDRX; or
in the case where the time domain position information includes the first time offset, the second time offset and the third time offset, the first time offset is used for DRX, and the second time offset and the third time offset are used for eDRX; or the first time offset and the second time offset are used for DRX, and the third time offset is used for eDRX; or
in the case where the time domain position information includes the first time offset, the second time offset, the third time offset and the fourth time offset, the first time offset and the second time offset are used for DRX, and the third time offset and the fourth time offset are used for eDRX.

In some embodiments, the frequency domain position information may include at least one of the following: a first starting resource block index, a second starting resource block index, a third starting resource block index, a first frequency domain offset or a second frequency domain offset.

In some embodiments, a first sequence is a corresponding sequence selected from a sequence set according to a sent WUS combination.

In some embodiments, correspondence between the sequence set and the WUS combination is preset. The correspondence is determined according to the number of groups, or the correspondence is determined according to the maximum number of groups. Optionally, when there are at least two time domain resource positions, various time domain resource positions may be configured with different sequence sets.

In some embodiments, the WUS may include at least one of the following: a group WUS or a normal WUS. The group WUS is a WUS corresponding to a group terminal in a PO. The normal WUS is a WUS corresponding to each terminal in the PO.

This embodiment of the present disclosure provides a wake up signal sending apparatus. A first sequence corresponding to a WUS is sent in a resource position corresponding to position information according to the number of groups corresponding to the WUS and position information about the WUS. This implements the configuration and sending of a group wake up signal, and avoids unnecessary PDCCH detection processes of a terminal, thereby reducing the power consumption of the terminal effectively.

Tenth Embodiment

Figure 5:
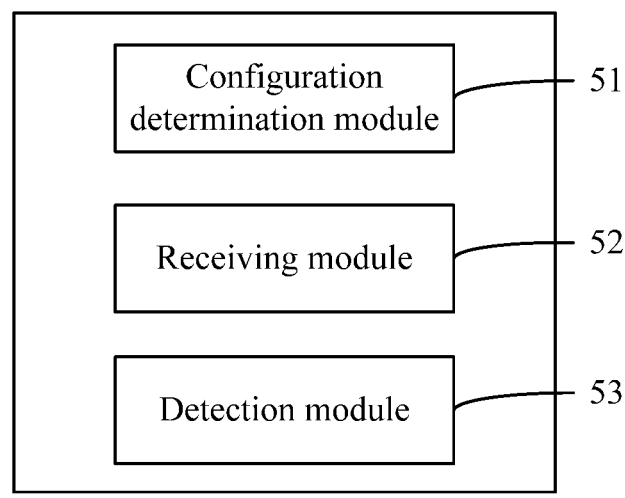
FIG. 5 is a schematic diagram of a wake up signal receiving apparatus according to a tenth embodiment of the present disclosure.

Referring to FIG. 5, FIG. 5 is a schematic diagram of a wake up signal receiving apparatus according to an embodiment of the present disclosure. The apparatus includes a configuration determination module 51, a receiving module 52 and a detection module 53.

The configuration determination module 51 is configured to determine, according to configured position information about a WUS, a resource position where the WUS is positioned.

The receiving module 52 is configured to receive a signal in the resource position.

The detection module 53 is configured to detect the signal.

In some embodiments, the position information may include at least one of the following: time domain position information or frequency domain position information.

In some embodiments, the time domain position information may include at least one of the following: a first time offset, a second time offset, a third time offset or a fourth time offset.

In some embodiments:
in the case where the time domain position information includes the first time offset and the second time offset, a terminal configured with a DRX mode uses the first time offset, and a terminal configured with an eDRX mode uses the second time offset; or
in the case where the time domain position information includes the first time offset, the second time offset and the third time offset, a terminal configured in a DRX mode uses the first time offset, and a terminal configured with an eDRX mode uses the second time offset and the third time offset; or a terminal configured with a DRX mode uses the first time offset and the second time offset, and a terminal configured with an eDRX mode uses the third time offset; or in the case where the time domain position information includes the first time offset, the second time offset, the third time offset and the fourth time offset, a terminal configured with a DRX mode uses the first time offset and the second time offset, and a terminal configured with an eDRX mode uses the third time offset and the fourth time offset.

In some embodiments, the frequency domain position information may include at least one of the following: a first starting resource block index, a second starting resource block index, a third starting resource block index, a first frequency domain offset or a second frequency domain offset.

In some embodiments, determining the resource position where the WUS is positioned according to the configured position information about the WUS includes at least one of the following:
a frequency domain position where the WUS is positioned is determined according to at least configured frequency domain position information; a time domain position where the WUS is positioned is determined according to at least configured time domain position information; a time domain resource position where WUS is positioned is determined according to at least a preset condition, where the preset condition includes at least one of the following: terminal processing capability, signaling, a group index or a terminal identifier; a frequency domain position where the WUS is positioned is determined according to at least a corresponding group index and a terminal identifier.

In some embodiments, the group index may be determined according to at least one of the following: the configured number of groups, or a terminal identifier group index.

In some embodiments, the detection module 53 may be specifically configured to determine a detection sequence set, and detect a signal according to the detection sequence set.

The detection sequence set is determined according to the group index and the number of groups. Alternatively, the detection sequence set is determined according to the WUS and the number of groups. Alternatively, the detection sequence set is determined according to the number of groups. Alternatively, the detection sequence set is determined according to the WUS.

In some embodiments, the terminal determines the number of groups according to configuration information about the number of receiving groups. The number of groups is at least one of the following: the number of groups corresponding to the terminal in a paging occasion (PO) corresponding to the WUS, the number of terminal groups corresponding to the same time-frequency resource position, or the number of terminal groups corresponding to the same time domain resource position.

In some embodiments, correspondence between the sequence set and the group index is preset. Optionally, when there are multiple time domain resource positions, the various time domain resource positions have different sequence sets.

This embodiment of the present disclosure provides a wake up signal receiving method. A resource position where a WUS is positioned is determined according to configured position information about the WUS. Then, the signal in the resource position is received. This implements the reception of a group wake up signal, and avoids unnecessary PDCCH detection processes of a terminal, thereby reducing the power consumption of the terminal effectively.

Eleventh Embodiment

Figure 6:
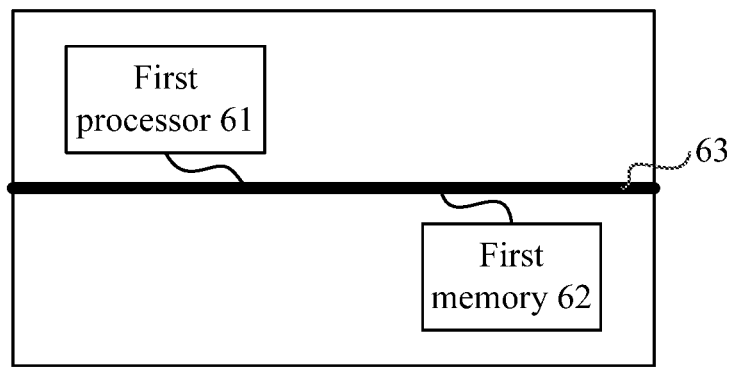
FIG. 6 is a schematic diagram of a base station according to an eleventh embodiment of the present disclosure.

This embodiment of the present disclosure further provides a base station. Referring to FIG. 6, the base station includes a first processor 61, a first memory 62 and a first communication bus 63. The first communication bus 63 is configured to implement connection and communication between the first processor 61 and the first memory 62. The first processor 61 is configured to execute one or more computer programs stored in the first memory 62, so as to implement the steps of the wake up signal sending method of the various embodiments above. The details are not repeated here.

Twelfth Embodiment

Figure 7:
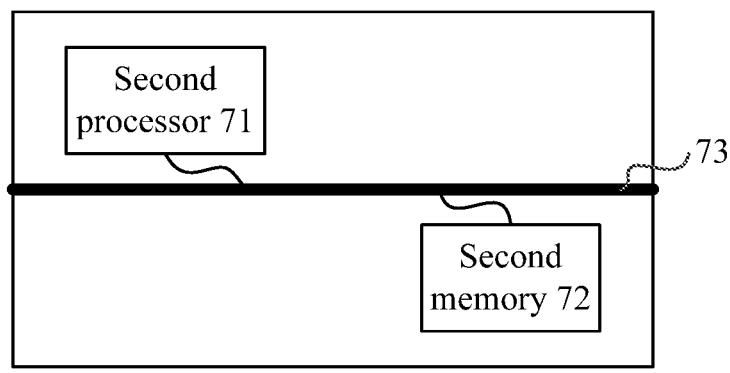
FIG. 7 is a schematic diagram of a terminal according to a twelfth embodiment of the present disclosure.

This embodiment of the present disclosure further provides a terminal. Referring to FIG. 7, the terminal includes a second processor 71, a second memory 72 and a second communication bus 73. The second communication bus 73 is configured to implement connection and communication between the second processor 71 and the second memory 72. The second processor 71 is configured to execute one or more computer programs stored in the second memory 72, so as to implement the steps of the wake up signal sending method of the various embodiments above. The details are not repeated here.

This embodiment of the present disclosure further provides a computer-readable storage medium. The computer-readable storage medium includes volatile or nonvolatile, removable or non-removable media implemented in any method or technology for storing information (such as computer-readable instructions, data structures, computer program modules or other data). The computer-readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium used for storing desired information and accessible by a computer.

In this embodiment of the present disclosure, the computer-readable storage medium may be configured to store one or more computer programs executable by a processor to implement at least one step of the wake up signal sending methods in the various embodiments above, or at least one step of the wake up signal receiving methods in the various embodiments above.

This embodiment of the present disclosure further provides a computer program (or computer software). The computer software may be distributed on a computer-readable medium and executed by a computing apparatus to implement at least one step of the wake up signal sending methods or at least one step of the wake up receiving methods in the various embodiments above.

This embodiment of the present disclosure further provides a computer program product. The computer program product includes a computer-readable apparatus storing the computer program illustrated above. In this embodiment of the present disclosure, the computer-readable apparatus may include the computer-readable storage medium illustrated above.

It can be seen that those of ordinary skill in the art should understand that functional modules/units in all or part of the steps of the method, the system, and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to a division of physical components. For example, one physical component may have multiple functions, or one function or step may be performed jointly by several physical components. Some or all physical components may be implemented as software executable by a processor such as a central processor, a digital signal processor or a microcontroller, may be implemented as hardware, or may be implemented as integrated circuits such as application-specific integrated circuits.

Additionally, as is known to those of ordinary skill in the art, a communication medium generally includes computer-readable instructions, data structures, computer program modules, or other data in modulated data signals such as carriers or other transmission mechanisms, and the communication medium may include any information delivery medium. Therefore, the present application is not limited to any particular combination of hardware and software.

The above is a more detailed description of the embodiments of the present disclosure in conjunction with, for example, specific implementation modes. The specific implementations of the present application cannot be construed as being limited to the description. For those of ordinary skill in the art to which the present application pertains, several simple deductions or substitutions may be made without departing from the concept of the present application and should fall within the scope of the present application.

What is claimed is:

1. A wake up signal sending method, comprising:
configuring the number of groups corresponding to a wake up signal (WUS) and position information about the WUS; and
sending a first sequence corresponding to the WUS in a resource position corresponding to the position information; wherein the first sequence is a corresponding sequence selected from a sequence set according to a sent WUS combination; wherein correspondence between the sequence set and the WUS combination is preset, and the correspondence is determined according to the number of groups, or the correspondence is determined according to a maximum number of groups;
wherein the position information comprises time domain position information; wherein the time domain position information comprises at least one of the following: a first time offset, a second time offset, a third time offset or a fourth time offset; and
wherein the time domain position information satisfies one of the following:
the time domain position information comprises the first time offset and the second time offset, the first time offset is used for discontinuous reception (DRX), and the second time offset is used for extended discontinuous reception (eDRX); or the time domain position information comprises the first time offset, the second time offset and the third time offset, wherein the first time offset is used for DRX, and the second time offset and the third time offset are used for eDRX; or, wherein the first time offset and the second time offset are used for DRX, and the third time offset is used for eDRX; or the time domain position information comprises the first time offset, the second time offset, the third time offset and the fourth time offset, the first time offset and the second time offset are used for DRX, and the third time offset and the fourth time offset are used for eDRX.

2. The wake up signal sending method of claim 1, wherein the number of groups is at least one of the following: the number of groups corresponding to a terminal in a paging occasion (PO) corresponding to the WUS, the number of terminal groups corresponding to a same time-frequency resource position, or the number of terminal groups corresponding to a same time domain resource position.

3. The wake up signal sending method of claim 1, wherein the position information further comprises frequency domain position information.

4. The wake up signal sending method of claim 3, wherein the resource position corresponding to the position information comprises any one of the following:
a resource position determined according to the position information; a resource position determined according to at least the position information and a group index corresponding to the WUS; or a resource position determined according to at least the position information, a group index corresponding to the WUS, and a cell identifier.

5. The wake up signal sending method of claim 3, wherein the frequency domain position information comprises at least one of the following: a first starting resource block index, a second starting resource block index, a third starting resource block index, a first frequency domain offset or a second frequency domain offset.

6. The wake up signal sending method of claim 1, wherein the WUS comprises at least one of the following: a group WUS or a normal WUS, the group WUS is a WUS corresponding to a group terminal in a PO, and the normal WUS is a WUS corresponding to each terminal in the PO.

7. A wake up signal receiving method, comprising:
receiving a number of groups corresponding to a wake up signal, WUS, and configured position information about the WUS;
determining, according to configured position information about a WUS, a resource position where the WUS is positioned;
receiving a signal corresponding to a first sequence corresponding to the WUS in the resource position, wherein the first sequence is a corresponding sequence selected from a sequence set, the sequence set is determined according to the number of groups, or the sequence set is determined according to a maximum number of groups; and
detecting, the signal corresponding to the first sequence corresponding to the WUS received at the resource position; wherein the position information comprises time domain position information; wherein the time domain position information comprises at least one of the following: a first time offset, a second time offset, a third time offset or a fourth time offset; and wherein the time domain position information satisfies one of the following:
the time domain position information comprises the first time offset and the second time offset, the first time offset is used for discontinuous reception (DRX), and the second time offset is used for extended discontinuous reception (eDRX); or the time domain position information comprises the first time offset, the second time offset and the third time offset, wherein a terminal configured with a DRX mode uses the first time offset, and a terminal configured with an eDRX mode uses the second time offset and the third time offset; or, wherein a terminal configured with a DRX mode uses the first time offset and the second time offset, and a terminal configured with an eDRX mode uses the third time offset; or the time domain position information comprises the first time offset, the second time offset, the third time offset and the fourth time offset, a terminal configured with a DRX mode uses the first time offset and the second time offset, and a terminal configured with an eDRX mode uses the third time offset and the fourth time offset.

8. The wake up signal receiving method of claim 7, wherein the position information further comprises frequency domain position information.

9. The wake up signal receiving method of claim 8, wherein the frequency domain position information comprises at least one of the following: a first starting resource block index, a second starting resource block index, a third starting resource block index, a first frequency domain offset or a second frequency domain offset.

10. The wake up signal receiving method of claim 7, wherein determining, according to the configured position information about the WUS, the resource position where the WUS is positioned comprises at least one of the following:
determining, according to at least configured frequency domain position information, a frequency domain position where the WUS is positioned; determining, according to at least configured time domain position information, a time domain resource position where the WUS is positioned; determining, according to at least a preset condition, a time domain resource position where WUS is positioned, wherein the preset condition comprises at least one of the following: terminal processing capability, signaling, a group index or a terminal identifier; or determining, according to at least a corresponding group index and a terminal identifier, a frequency domain position where the WUS is positioned.

11. The wake up signal receiving method of claim 7, wherein a group index corresponding to the WUS is determined according to at least one of the following: a number of groups, a resource position, a terminal identifier, a terminal type or a terminal capability.

12. The wake up signal receiving method of claim 7, wherein detecting, the signal corresponding to the first sequence corresponding to the WUS received at the resource position comprises:

determining a detection sequence set, and detecting the signal according to the detection sequence set, wherein the detection sequence set is determined according to a group index and the number of groups, or the detection sequence set is determined according to the WUS and the number of groups, or the detection sequence set is determined according to the number of groups, or the detection sequence set is determined according to the WUS.

13. The wake up signal receiving method of claim 7, further comprising: determining, the number of groups according to configuration information about the number of groups, wherein the number of groups is at least one of the following: the number of groups corresponding to a terminal in a paging occasion (PO) corresponding to the WUS, the number of terminal groups corresponding to a same time-frequency resource position, or the number of terminal groups corresponding to a same time domain resource position.

14. A base station, comprising: a first processor, a first memory and a first communications bus; wherein the first communication bus is configured to implement connection and communication between the first processor and the first memory; and the processor is configured to execute one or more computer programs stored in the first memory, so as to perform the steps of the wake up signal sending method of claim 1.

15. A terminal, comprising: a second processor, a second memory and a second communications bus; wherein the second communication bus is configured to implement connection and communication between the second processor and the second memory; and the second processor is configured to execute one or more computer programs stored in the second memory, so as to perform the steps of the wake up signal receiving method of claim 7.

* * * * *